Figure 1:
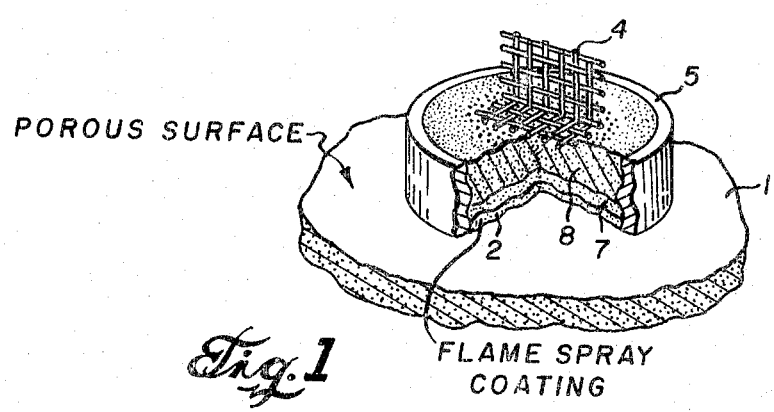

May 9, 1967　　　K. W. KREISELMAIER　　　3,318,730

METHOD OF DISPERSING A CATALYST IN FUEL CELL ELECTRODES

Filed March 4, 1963

Kurt W. Kreiselmaier
INVENTOR

BY Robert C. Peterson
ATTORNEY

United States Patent Office 3,318,730
Patented May 9, 1967

3,318,730
METHOD OF DISPERSING A CATALYST IN FUEL CELL ELECTRODES
Kurt W. Kreiselmaier, Dallas, Tex., assignor to Texas Instruments Incorporated, Dallas, Tex., a corporation of Delaware
Filed Mar. 4, 1963, Ser. No. 262,648
7 Claims. (Cl. 117—212)

This invention relates to electrodes for fuel cells and more particularly, to the process of distributing a catalyst within the electrode of a fuel cell.

In general, the utilization of catalysts to enhance the operation of fuel cells or batteries is quite successful, providing among other advantages improved current density characteristics. Catalysts of this nature are quite useful when dispersed in porous electrode structures such as those utilized in a fuel cell where the electrode, electrolyte and oxidant or fuel gas concurrently contact one another.

Difficulty often occurs in providing a sufficiently uniform distribution of catalysts throughout the porous structure so that the gas and electrolyte contact one another uniformly and consistently in the presence of a uniform and consistent amount of catalysts.

The invention herein disclosed appertains to providing a process whereby porous electrode structures typically utilized in fuel cells or batteries may be impregnated or infused with catalysts, and particularly metal and metal oxide catalysts. Preferably in the invention liquid organic compounds of typical metals which have catalytic properties are utilized for soaking or otherwise saturating the electrodes. Sometimes organic solvents are used to adjust the viscosity of the organic compound to aid dispersion within the electrode. To remove organic solvents, the electrodes are dried at moderate temperatures, and then to provide decomposition of the organic compound, the electrodes are baked at high temperatures thereby volatilizing the organic components of the compound and leaving the resulting metal or oxide of metal uniformly and evenly dispersed throughout the electrode structure. Thus, a high degree of catalyst surface area is provided uniformly dispersed and distributed within the electrode. Therefore, the concentration of catalysts in the electrode can normally be lower.

Typically the organic compounds that may be dispersed within the electrodes are referred to as metal "resinate solutions" which are commercially available. Typical metal resinate solutions contain barium, cobalt, iron, nickel, silver, titanium, zinc, zirconium, etc.

Moreover, because the metal resinate solutions can be intimately mixed with one another, it is relatively easy to add a promoter catalyst to another catalyst in exact known amounts and maintain this relationship throughout the dispersion in the electrodes. Thus, the invention affords a large degree of flexibility to the selection of catalysts and provides a simple process to achieve the desired results.

Therefore, it is an object of the invention to provide a method of making a porous gas electrode for a fuel cell or battery which contains uniformly distributed catalytic material therein.

Another object of the invention is to provide a method of dispersing metals and oxides of metals which are suitable for catalyzing a fuel cell reaction within the interstices of a porous gas electrode.

It is another object of the invention to provide a fuel cell having a fuel electrode and an oxidant electrode in which one of said electrodes has been subjected to infusion of a metal-organic complex solution and thereafter dried at moderate temperatures and baked at high temperatures to decompose the organic material of said solution, leaving a residue of the oxide of the metal or the metal itself uniformly dispersed throughout the electrode.

Another object of the invention is to provide a process for making an electrode containing a catalyst for use as one electrode of a fuel cell comprising forming a porous electrode, dispersing uniformly throughout said electrode a solution of an organic compound of a metal, drying said solution and thereafter decomposing and volatilizing the organic component of said organic compound leaving the metal oxide of the metal.

Figure 2:
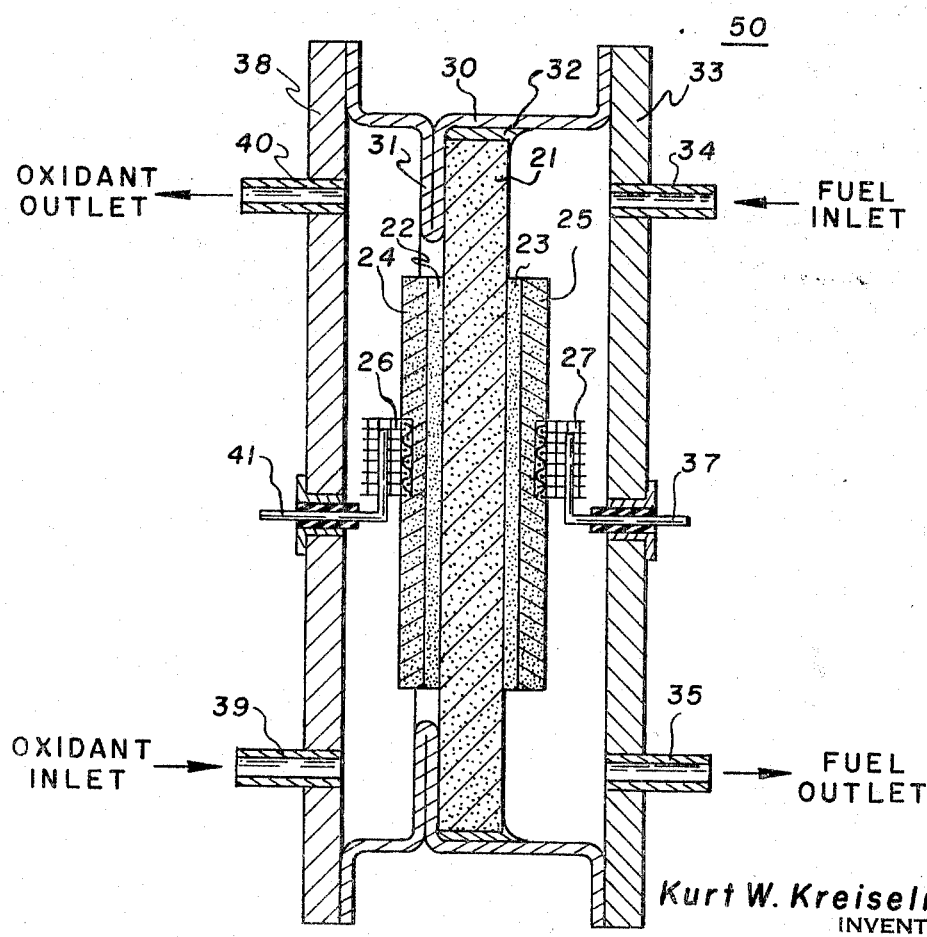

These and other objects and advantages of the invention will become readily apparent from the description following hereinafter and the appended claims in conjunction with the drawings, wherein:

FIGURE 1 illustrates typical structure of an electrode in accordance with the invention; and FIGURE 2 illustrates a fuel cell utilizing the electrode of the invention.

Referring specifically to FIGURE 1, there is illustrated a fuel cell electrode prepared with a catalyst therein in accordance with the invention. In conjunction with FIGURE 1, the preferred method of making the catalyzed electrode will now be set forth. A porous magnesium oxide disk 1 (or other suitable ceramic electrolyte carrier) frame-sprayed with a coating 2 of silver over a circular area of the disk 1 having a typical diameter of approximately 1¾ inches. A stainless steel cylindrical form 5 having an annulus which conforms to the periphery of the flame-sprayed coating 2 is positioned thereabout. A first layer 7 of approximately 4 grams of silver powder having a 120–150 mesh (National Bureau of Standards "routine grade" sieve analysis in which the mesh indicates the approximate number of openings per linear inch) is uniformly spread over the flame-sprayed silver. A second layer 8 containing approximately 4 grams of silver powder having a 100–120 mesh (National Bureau of Standards) is placed on top of the first layer 7 of powder metal. These two layers form the porous electrode. A silver screen 4 is positioned in the second layer 8 of the silver powder. Next, a weight of approximately 140 grams (9 grams/cm.$^2$) is positioned to fit within the annulus of the stainless steel form, thus providing a pressure against the silver powder and silver screen. Next, the entire assembly is placed in a furnace and heated to 850° C. (or any suitable sintering temperature) for one hour in an inert atmosphere. The sintered silver electrode prepared as above is next impregnated with the metal resinate solution. As aforesaid, the various metal resinates may be blended together to provide various metals or oxides of metals or both dispersed within the electrode. The sintered electrode prepared above is impregnated with approximately 4 grams of resinate solution. Since the resinate solution used has some solvent therein, it is relatively easy to produce a viscous liquid thereof at a consistency desirable for painting or brushing the liquid onto the electrode and otherwise saturating the electrode with the liquid resinate solution. After the electrode has been saturated with the resinate solution, it is dried for about two hours at approximately 140° C. to 200° C., evaporating the volatile matter therein. After the solvent has evaporated, the resinate infused electrode is transferred to a furnace where it is heated from 400° C. to 800° C. to decompose the resinate into its corresponding metal or metal oxide. Usually, it only takes approximately 30 minutes to convert the resinate to the metal or oxide thereof.

Table I presented hereinafter contains numerous specific examples of electrodes fabricated in accordance with the invention utilizing various metal resinates, along with the drying temperature and the firing temperature to convert the particular metal resinates or mixtures thereof into their metals or metal oxides. Also included are the particle sizes and weights of the silver powder utilized for making the electrodes.

TABLE I

| Example No. | Metal Resinate | | | Electrode | | | Conversion, temp., °C. |
|---|---|---|---|---|---|---|---|
| | Type | Weight, grams | Percent Metal | Particle Size | Weight, grams | Diameter, inches | |
| 1 | Ni | 2 | 9.4 | 100-120 | 4 | 1¾ | 800 |
| | Zn | 2 | 5.6 | 120-150 | 4 | | |
| 2 | Ni | 2 | 9.4 | 100-120 | 4 | 1¾ | 800 |
| | Zn | 2 | 5.6 | 120-150 | 4 | | |
| 3 | Ni | 2 | 9.5 | 80-100 | 3 | 1¾ | 650 |
| | Zn | 2 | 5.6 | 100-150 | 3 | | |
| | Cr | 0.4 | 3.9 | | | | |
| 4 | Ni | 3 | 9.4 | 80-100 | 5 | 1¾ | 700 |
| | Zn | 3 | 5.6 | 100-150 | 2 | | |
| | Cr | 1 | 3.9 | | | | |
| 5 | Ni | 3 | 9.4 | 80-100 | 1.8 | 2 | 700 |
| | Zn | 3 | 5.6 | 100-150 | 6 | | |
| | Cr | 1 | 3.9 | | | | |
| 6 | Ni | 5 | 9.4 | 80-100 | 12.5 | 4¼ | 700 |
| | Zn | 5 | 5.6 | 100-150 | 12.5 | | |
| | Cr | 0.5 | 3.9 | | | | |
| 7 | Co | 6.6 | 3.1 | 100-120 | 3 | 1¾ | 700 |
| | | | | 100-150 | 3 | | |
| 8 | Ba | 10 | 11.6 | 100-120 | 3 | 1¾ | 700 |
| | | | | 120-150 | 3 | | |

Referring specifically to FIGURE 2, there is illustrated a fuel cell utilizing the different electrodes fabricated in accordance with the invention as fuel electrode 25 of the fuel cell generally designated 50. As illustrated, the fuel cell comprises a porous magnesium oxide disk 21, having a flame-sprayed silver layer 23 on one side and a flame-sprayed silver layer 22 on the opposite side. On top of layer 23 is the sintered porous electrode 25 prepared in accordance with the invention, including one of the metal resinate treatments of Table I. A screen contact 27 provides an electrical contact to the electrode itself. A porous electrode 24 having an electrical screen contact 26 was sintered onto the silver layer 22. The MgO disk 21 is secured to an inwardly-projecting shoulder 31 of circular housing 30 by a suitable sealant 32. A closing plate 38, containing oxidant inlet 39 and oxidant outlet 40, is sealed against a flange of housing 30 and forms the oxidant chamber. The closure plate 38 also has an electrical lead in 41 attached to the wire contact 26. A closure plate 33, containing fuel inlet 34 and fuel outlet 35, is sealed against a second flange of housing 30 to provide the fuel chamber. Closure plate 33 contains an electrical lead through 37 which is attached to screen 27.

The fuel cell illustrated in FIGURE 2 utilizing the various electrodes described in Table I as the fuel electrode was operated under conditions and produce the results disclosed in Table II hereinafter set forth.

Numerous specific examples of the metal resinates or metal organic compounds which may be utilized in the invention have been disclosed. Thus, it will be appreciated that many aliphatic, aromatic, etc., metal organic compounds exist that suitably appertain to the invention. Many other metal organic compounds will become readily apparent to those skilled in the art, and such variations of the process are within the scope of the invention which is limited only as necessitated by the scope of the appended claims.

What is claimed is:
1. A method of treating a porous, electrically conductive electrode for an electrochemical power source comprising the steps of:
    (a) infusing the porous electrode with a liquid metal organic compound, the metal element of said compound being selected from the group consisting of nickel, zinc, chromium, cobalt and barium, and
    (b) thermally decomposing the metal organic compound to volatilize the organic component therefrom, leaving the metal component dispersed throughout the porous electrode.
2. A method of treating an electrode for an electrochemical power source comprising the steps of:
    (a) producing a porous, electrically conductive matrix useful as an electrode in said power source,
    (b) infusing said matrix with a metal organic compound, the metal element of said compound being selected from the group consisting of nickel, zinc, chromium, cobalt and barium,

TABLE II

| Example No. | Fuel Type | Flow Rate, cc./min. | Oxidant Type | Flow Rate, cc./min. | Operating Temperature, °C. | Power at 0.5 Volts, watts/ft.² |
|---|---|---|---|---|---|---|
| 1 | $H_2$ | 480 | Air | 400 | 600 | 60 |
| | | | $CO_2$ | 100 | | |
| 2 | $H_2$ | 480 | Air | 400 | 600 | 48 |
| | | | $CO_2$ | 100 | | |
| 3 | $H_2$ | 480 | Air | 400 | 600 | 39 |
| | | | $CO_2$ | 100 | | |
| 4 | $H_2$ | 480 | Air | 400 | 600 | 50 |
| | | | $CO_2$ | 100 | | |
| 5 | $H_2$ | 480 | Air | 400 | 600 | 40 |
| | | | $CO_2$ | 100 | | |
| 6 | $H_2$ | 480 | Air | 400 | 600 | 22 |
| | | | $CO_2$ | 100 | | |
| 7 | $H_2$ | 480 | Air | 400 | 600 | 67 |
| | | | $CO_2$ | 100 | | |
| 8 | $H_2$ | 480 | Air | 400 | 600 | 67 |
| | | | $CO_2$ | 100 | | |

(c) heating said matrix infused with the metal organic compound for a period of time at a temperature sufficient to volatilize any solvents therefrom, and (d) decomposing the metal organic compound at a temperature sufficient to evaporate the organic components of said compound leaving the metal element as a residue uniformly distributed within said matrix.

3. A method of treating an electrode for a fuel cell comprising the steps of:

(a) producing a porous, electrically conductive matrix useful as a fuel cell electrode, (b) impregnating said matrix with a liquid metal organic compound, the metal element of said compound being selected from the group consisting of nickel, zinc, chromium, cobalt and barium, and (c) thermally decomposing said metal organic compound to volatilize the organic component therefrom, leaving the metal component dispersed throughout the interstices of said matrix.

4. A method of treating a porous, electrically conductive fuel cell electrode comprising the steps of:

(a) forming a mixture of a liquid metal organic compound and a solvent, the metal element of said organic compound being selected from the group consisting of nickel, zinc, chromium, cobalt and barium, (b) infusing the porous, fuel cell electrode with said mixture to distribute the metal organic compound therein, (c) evaporating the solvent from said mixture leaving the metal organic compound dispersed therein, and (d) volatilizing the organic component of said organic compound to leave the metal component in its most catalytic state dispersed within said electrode.

5. A method of making a fuel cell electrode comprising the steps of:

(a) coating a portion of a porous ceramic fuel cell electrolyte carrier by flame-spraying with a metal, (b) sintering metal powder in place on the metal coating to form a porous electrode, (c) dispersing a liquid metal organic compound within the porous electrode, the metal component of said compound being selected from the group consisting of nickel, zinc, chromium, cobalt and barium, and (d) volatilizing the organic component of said liquid metal organic compound to leave the metal component dispersed within said porous electrode.

6. A method of making a catalyzed fuel cell electrode comprising the steps of:

(a) coating a portion of a porous ceramic fuel cell electrolyte carrier with a porous metal film, (b) sintering metal powder in place on the metal film to form an electrode contiguous with said metal film, (c) infusing a mixture of at least two liquid metal organic compounds within said electrode, the metal components in said mixture being selected from the group consisting of nickel, zinc, chromium, cobalt and barium, and (d) volatilizing the organic component of said mixture to leave the metal component thereof dispersed within said electrode.

7. A method of dispersing catalyst within a porous fuel cell electrode comprising the steps of:

(a) adjusting the viscosity of a liquid metal organic compound to a value suitable for absorption of said compound in the pores of the electrode, the metal component of said compound being selected from the group consisting of nickel, zinc, chromium, cobalt and barium, (b) then impregnating the electrode with said compound, and (c) volatilizing all organic components from said compound to leave the metal component dispersed within said porous electrode.

References Cited by the Examiner

UNITED STATES PATENTS 3,160,527  12/1964  Hess _____ 136—86

FOREIGN PATENTS 164,457  8/1955  Australia.
233,847  5/1961  Australia.
935,430  8/1963  Great Britain.

ALFRED L. LEAVITT, *Primary Examiner.*

WILLIAM L. JARVIS, *Examiner.*